United States Patent [19]

Klepper et al.

[11] Patent Number: 4,667,722
[45] Date of Patent: May 26, 1987

[54] PNEUMATIC TIRE

[75] Inventors: Guy E. D. Klepper, Strassen; Hendrik Kornelis, Diekirch, both of Luxembourg; Jean-Claude Alie, Bastogne, Belgium

[73] Assignee: The Goodyear Tire & Rubber Company, Akron, Ohio

[21] Appl. No.: 795,809

[22] Filed: Nov. 7, 1985

[51] Int. Cl.$^4$ ............................................. B60C 15/06
[52] U.S. Cl. ..................................... 152/543; 152/546; 152/554
[58] Field of Search ............... 152/540, 543, 546, 547, 152/548, 542, 538, 552, 554

[56] References Cited

U.S. PATENT DOCUMENTS

| 3,941,177 | 3/1976 | Okada et al. | 152/543 |
| 4,046,183 | 9/1977 | Takahashi et al. | 152/546 X |
| 4,086,948 | 5/1978 | Suzuki et al. | 152/540 |
| 4,093,014 | 6/1978 | Tomoda et al. | 152/543 |
| 4,289,184 | 9/1981 | Motomura et al. | 152/543 |
| 4,319,621 | 3/1982 | Motomura et al. | 152/543 |
| 4,342,353 | 8/1982 | Tamura et al. | 152/543 |
| 4,508,153 | 4/1985 | Tanaka et al. | 152/546 |

FOREIGN PATENT DOCUMENTS

| 1605677 | 6/1970 | Fed. Rep. of Germany . | |
| 2027274 | 12/1970 | Fed. Rep. of Germany | 152/540 |
| 2032688 | 3/1972 | Fed. Rep. of Germany . | |
| 2525078 | 12/1976 | Fed. Rep. of Germany . | |
| 2313218 | 12/1976 | France | 152/546 |
| 1553888 | 10/1979 | United Kingdom . | |
| 2119919 | 7/1983 | United Kingdom . | |

Primary Examiner—Donald E. Czaja
Assistant Examiner—Ramon R. Hoch
Attorney, Agent, or Firm—L. R. Drayer

[57] ABSTRACT

A radial tire having a carcass ply (17) with an inside-to-outside turn-up portion (19) around each bead (13). In each bead portion (11) there is included a reinforcing ply 22 having portions (22A,22B) on each axial side of the bead (13). The axially outer portion (22A) adjacent each turn-up portion (19), and optionally the turn-up itself, extends radially outwardly of the bead (13), and the axially inner portion (22B) extends radially outwardly to terminate at a point (S) located on a line (Q—Q) which is substantially perpendicular to the carcass ply (17) and passing through the radially outermost end (R) of axially outer portion (22A), or the radially outermost end (U) of the carcass ply turn-up (19).

2 Claims, 4 Drawing Figures

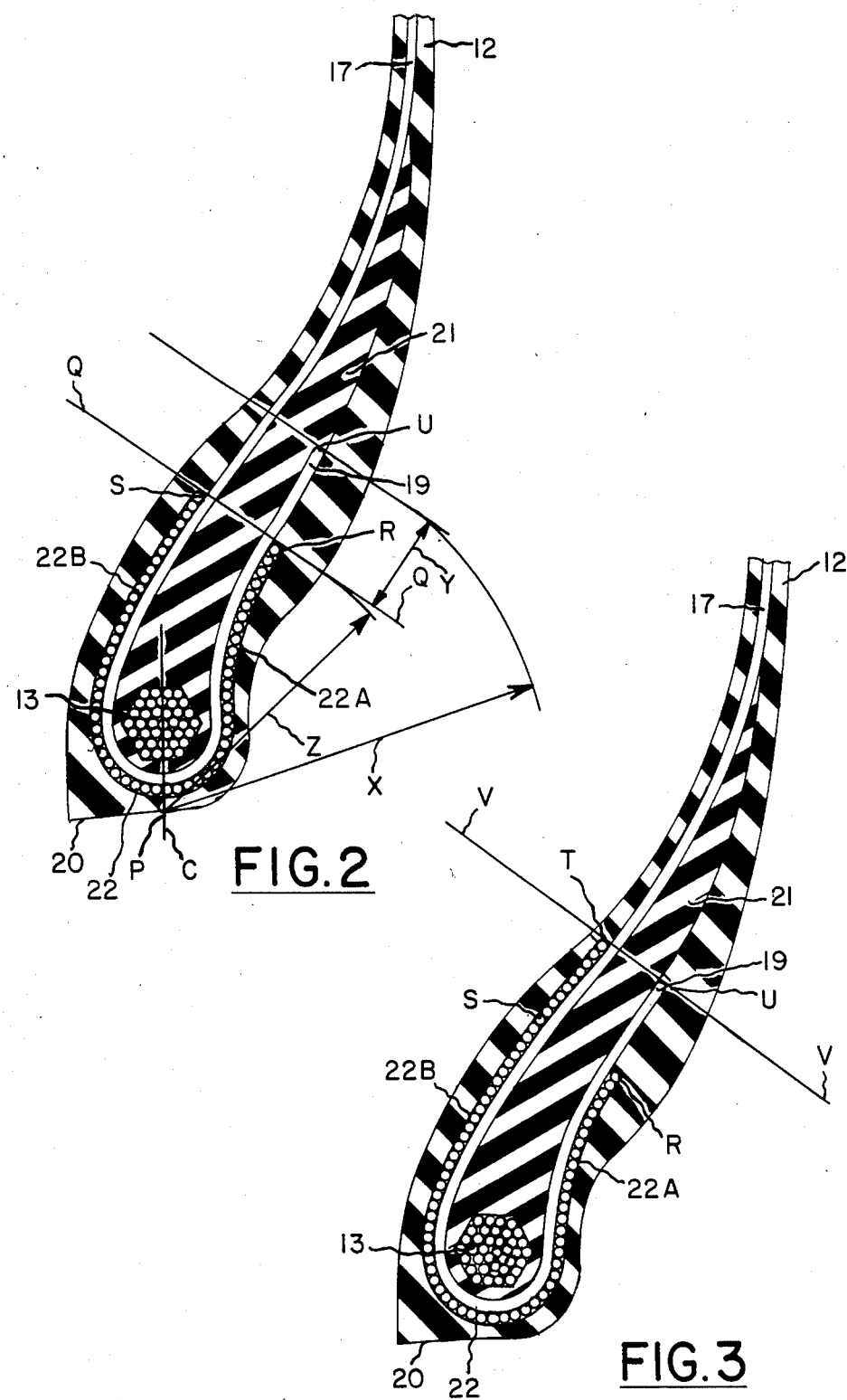

PNEUMATIC TIRE

This invention relates generally to pneumatic tires and in particular to truck tires.

Radial carcass truck tires are frequently used under heavy load conditions which place the components within the tire under severe stress. The bead portions of such tires are particularly subject to large deformations which can cause a buildup of heat in the tire and subsequent separation failure. As used herein and in the appended claims a truck tire is any tire having a nominal bead diameter of at least 15 inches (38.1 cm).

The applicants have discovered a tire construction with a particularly durable bead portion.

There is provided in accordance with one aspect of the invention a radial ply tire comprising a pair of bead portions each of which contains an annular bead, a carcass ply reinforced by steel cords extending between said beads and having a turn-up portion wrapped around each bead from the axially inner side to the axially outer side thereof, in each bead portion on the side of the carcass ply furthest away from the bead is located a reinforcing ply containing steel cords, portions of each reinforcing ply being disposed on each axial side of the respective bead, the axially outer portion of each reinforcing ply and the adjacent turn-up portion of the carcass ply both extending radially outwardly of the bead to their respective radially outer ends, and an axially inner portion of each reinforcing ply extending radially outwardly to its radially outer end, both ends of said reinforcing ply being located on a straight line which is substantially perpendicular to the carcass ply at the point where it intersects the carcass ply.

There is provided in accordance with another aspect of the invention a radial ply tire comprising a pair of bead portions, each of which contains an annular bead, a carcass ply reinforced by steel cords extending between said beads and having a turn-up portion wrapped around each bead from the axially inner side to the axially outer side thereof, in each bead portion on the side of the carcass ply furthest away from the bead is located a reinforcing ply containing steel cords, portions of each reinforcing ply being disposed on each axial side of the respective bead, the axially outer portion of each reinforcing ply and the adjacent turn-up portion of the carcass ply both extending radially outwardly of the bead to their respective radially outer ends with the turn-up portion of the carcass ply extending radially outwardly beyond the axially outer portion of the reinforcing ply, and an axially inner portion of each reinforcing ply extending radially outwardly to its radially outer end, the radially outer end of the axially inner portion of the reinforcing ply and the radially outer end of the nearest turn-up portion of the carcass ply both lying on the same straight line, with said straight line being substantially perpendicular to the carcass ply at the point where it intersects the carcass ply.

There is provided in accordance with another aspect of the invention a radial ply tire comprising a pair of bead portions each of which contains an annular bead, each bead portion having a radially inner surface that is inclined at about 5° with respect to the axis of rotation of the tire, a carcass ply reinforced by steel cords extending between said beads and having a turn-up portion wrapped around each bead from the axially inner side to the axially outer side thereof, in each bead portion on the side of the carcass ply furthest away from the bead is located a reinforcing ply containing steel cords that are arranged at an angle of between 55° to 65° with a respective radial plane of the tire, portions of each reinforcing ply being disposed on each axial side of the respective bead, the axially outer portion of each reinforcing ply and the adjacent turn-up portion of the carcass ply both extending radially outwardly of the bead to their respective radially outer ends, and an axially inner portion of each reinforcing ply extending radially outwardly to its radially outer end, both ends of said reinforcing ply being located on a straight line which is substantially perpendicular to the carcass ply at the point where it intersects the carcass ply, each turn-up portion of the carcass ply extending radially outwardly beyond the adjacent axially outer portion of the reinforcing ply, the radially outer end of the axially outer portion of each reinforcing ply being located at a distance of between 0.3–0.4 H from a reference point P defined by the intersection of a radially extending line passing through the center of the bead and the radially inner surface of the bead portion, the radially outer end of the adjacent turn-up portion of the carcass ply being located at a distance of between 0.4 and 0.6 H from said reference point, and wherein H is the radial distance between a line passing through the reference point P parallel with the axis of rotation of the tire and another line that is also parallel to said axis and passes through a sidewall of the tire at the widest part of the tire, the radially outer end of the turn-up portion of the carcass ply is located at a distance of about 0.5 H from said reference point P.

There is provided in accordance with another aspect of the invention a radial ply tire comprising a pair of bead portions each of which contains an annular bead, each bead portion having a radially inner surface that is inclined at about 15° with respect to the axis of rotation of the tire, a carcass ply reinforced by steel cords extending between said beads and having a turn-up portion wrapped around each bead from the axially inner side to the axially outer side thereof, in each bead portion on the side of the carcass ply furthest away from the bead is located a reinforcing ply containing steel cords that are arranged at an angle of between 55° to 65° with a respective radial plane of the tire, portions of each reinforcing ply being disposed on each axial side of the respective bead, the axially outer portion of each reinforcing ply and the adjacent turn-up portion of the carcass ply both extending radially outwardly of the bead to their respective radially outer ends, and an axially inner portion of each reinforcing ply extending radially outwardly to its radially outer end, both ends of said reinforcing ply being located on a straight line which is substantially perpendicular to the carcass ply at the point where it intersects the carcass ply, each radially outer portion of a reinforcing ply extending radially outwardly beyond the adjacent turn-up portion of the carcass ply, the radially outer end of the axially outer portion of each reinforcing ply being located a distance of between 0.4 to 0.45 H from a reference point $P_2$ defined by the intersection of a radially inner surface of the bead portion and an axially outer surface of the bead portion, and H is the radial distance between a line passing through said reference point $P_2$ parallel with the axis of rotation of the tire and another line that is also parallel to said axis and passes through a sidewall of the tire at the widest part of the tire, the radially outer end of each turn-up portion of the carcass ply being located at a distance of about 0.3 H from said reference point $P_2$.

There is provided in accordance with another aspect of the invention a radial ply tire comprising a pair of bead portions, each bead portion having a radially inner surface that is inclined at about 5° with respect to the axis of rotation of the tire, each of which contains an annular bead, a carcass ply reinforced by steel cords extending between said beads and having a turn-up portion wrapped around each bead from the axially inner side to the axially outer side thereof, in each bead portion on the side of the carcass ply furthest away from the bead is located a reinforcing ply containing steel cords that are arranged at an angle of between 55° to 65° with a respective radial plane of the tire, portions of each reinforcing ply being disposed on each axial side of the respective bead, the axially outer portion of each reinforcing ply and the adjacent turn-up portion of the carcass ply both extending radially outwardly of the bead to their respective radially outer ends with the turn-up portion of the carcass ply extending radially outwardly beyond the axially outer portion of the reinforcing ply, and an axially inner portion of each reinforcing ply extending radially outwardly to its radially outer end, the radially outer end of the axially inner portion of the reinforcing ply and the radially outer end of the nearest turn-up portion of the carcass ply both lying on the same straight line, with said straight line being substantially perpendicular to the carcass ply at the point where it intersects the carcass ply, the radially outer end of the axially outer portion of each reinforcing ply being located at a distance of between 0.3–0.4 H from a reference point P defined by the intersection of a radially extending line passing through the center of the bead and the radially inner surface of the bead portion, the radially outer end of the adjacent turn-up portion of the carcass ply being located at a distance of between 0.4 and 0.6 H from said reference point, and wherein H is the radial distance between a line passing through the reference point P parallel with the axis of rotation of the tire and another line that is also parallel to said axis and passes through a sidewall of the tire at the widest part of the tire, the radially outer end of the turn-up portion of the carcass ply being located at a distance of about 0.5 H from said reference point P.

The invention will be described by way of example and with reference to the following drawings in which:

FIG. 2 is an enlarged radial cross-sectional view of a lower sidewall and bead portion of the tire of FIG. 1;

FIG. 3 is an enlarged radial cross-sectional view of a lower sidewall and bead portion of a tire comprising a second embodiment of the invention.

As used herein, the terms "radial" and "radially" refer to displacements in directions perpendicular to the axis of rotation of a tire, and the terms "axial" and "axially" relate to displacements in directions parallel to the axis of rotation of a tire.

Figure 1:
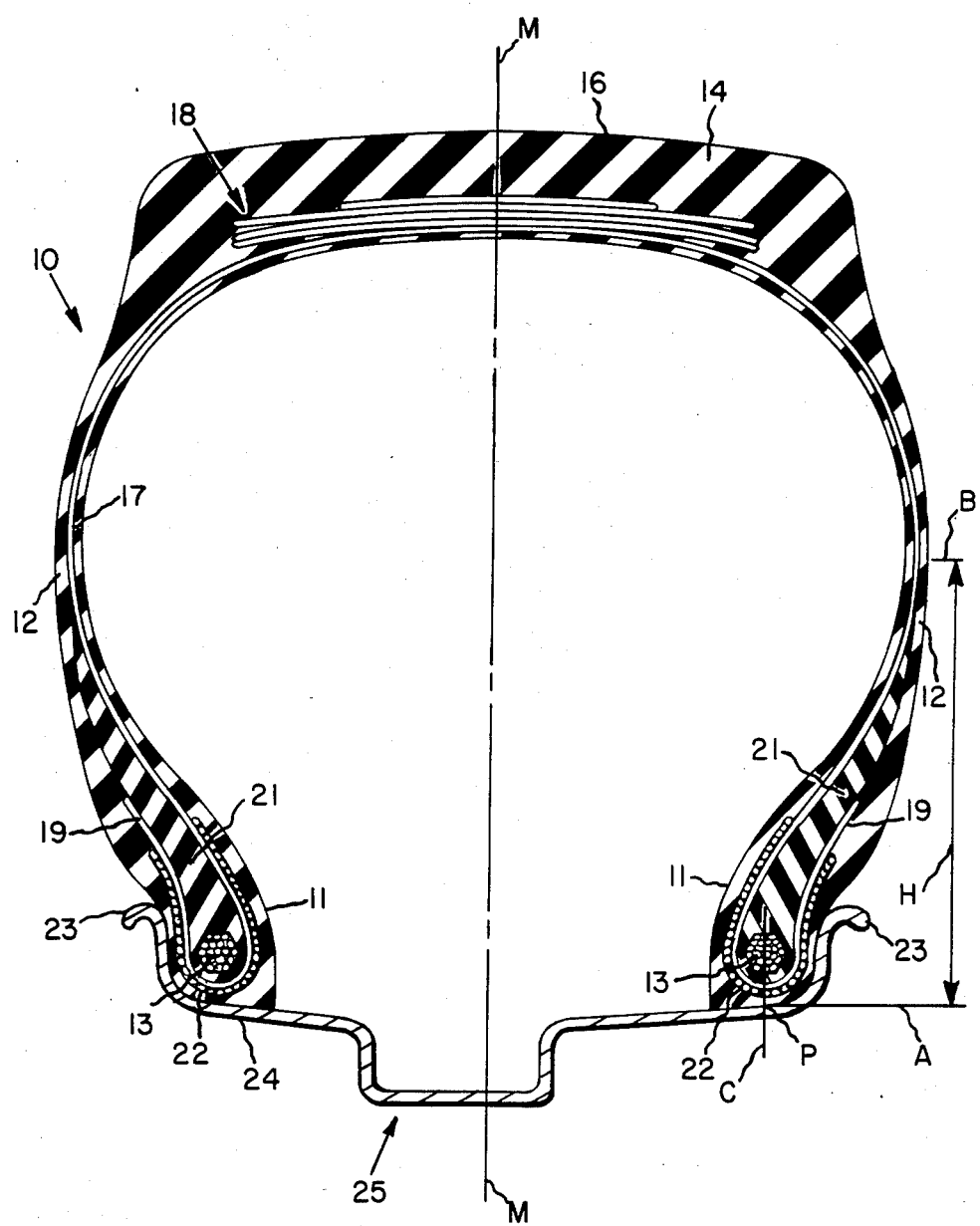
FIG. 1 is a radial cross-sectional view of a tire according to a first embodiment of the present invention.

With reference to FIGS. 1, 2 and 3, there is illustrated a radial cross-section through a radial carcass pneumatic truck tire designed for mounting on a wheel rim, and enlarged views of one of the lower sidewalls and bead portions of the same tire.

The tire 10 comprises a pair of annular bead portions 11 for engaging the bead seats 24 and flanges 23 of a wheel rim 25. Each bead portion 11 contains a substantially inextensible annular bead 13 formed from steel cord or a similar material. A sidewall 12 extends radially outwardly from each bead portion 11 into a crown portion 14 of the tire. The crown portion 14 has a ground contacting tread 16 extending circumferentially thereabout.

The tire 10 has at least one carcass ply 17 extending from one bead 13 to the other bead 13 and which comprises an elastomeric ply reinforced by cords of a suitable material such as steel, or aromatic polyamide. Preferably the carcass ply of a tire according to the present invention is reinforced with steel cords. The cords in the carcass ply 17 are substantially parallel with each other and are orientated at an angle of between 75° and 90° with respect to the mid-circumferential plane M—M of the tire. The mid-circumferential plane is a plane normal to the axis of rotation of the tire located midway between the beads of the tire. The tire 10 is further reinforced in the crown portion 14 by an annular belt structure 18 disposed radially outwardly the carcass ply 17. The belt structure illustrated comprises four superposed unfolded belts, but other belt constructions which are practiced in the art could be utilized, for example, folded belts or split belts.

In each bead portion 11, the carcass ply 17 passes on the axially inner side of the bead 13 and has a turn-up portion 19 which is wrapped back around the axially outer side of the same bead 13. The terms "axially inner" and "axially outer" refer to axial positions relative to the mid-circumferential plane M—M. An annular elastomeric strip 21 having a substantially triangular radial cross-section, sometimes referred to as an apex, is located radially outwardly of each bead 13 between the carcass ply 17 and the turn-up portion of the carcass ply 19.

Figure 4:
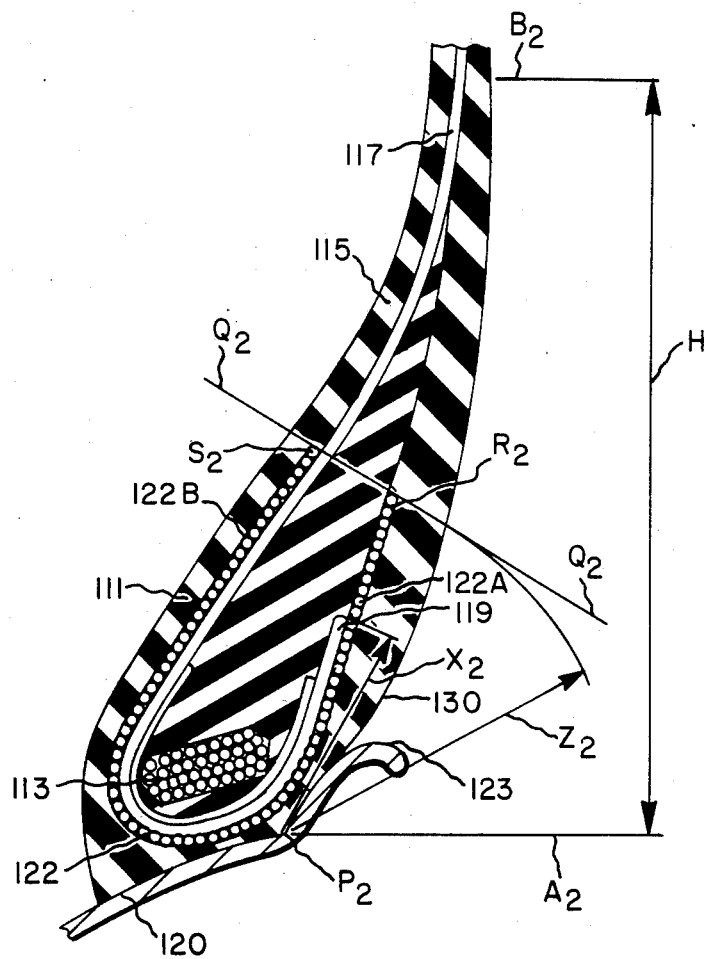
FIG. 4 is an enlarged radial cross-sectional view of a bead portion of a tire comprising a third embodiment of the present invention.

In each bead portion 11, on the side of the carcass ply furthest away from the bead 13 there is located a reinforcing ply 22. Each reinforcing ply 22 comprises a cord reinforced elastomeric ply, in which the cords are formed of a suitable steel cord. The cords in each reinforcing ply 22 are substantially parallel with each other and are arranged at an angle of between 20° –70° and preferably 55° –65° with a respective radial plane of the tire. Each reinforcing ply 22 has portions 22A and 22B located on the axially outer and axially inner sides respectively of the bead 13. The axially outer and inner portions 22A and 22B of each reinforcing ply extend radially outwardly of the respective bead 13, and each axially outer portion 22A extends radially outwardly beyond a rim flange 23 of a rim on which the tire is designed to be mounted. The axially outer portion 22A of the reinforcing ply is preferably directly adjacent to the turn-up portion 19 of the carcass ply, but could be spaced from the turn-up portion of the carcass ply by an intermediate elastomeric layer. The radially outer end R of the axially outer portion 22A of the reinforcing ply terminates at a distance Z from a reference point P defined by the intersection of a radially extending line C passing through the center of the bead 13 and the radially inner surface 20 of the bead portion. As used herein and in the claims, all distances from a reference point P of FIGS. 1,2 and 3 or $P_2$ of FIG. 4 are the lengths of radii of circles having centers located at the reference point P, with the circle intersecting an end of the respective component of the tire. The radially inner surface 20 of a bead portion is oriented at a small angle of about 5° to 15° with respect to the axis of rotation of the tire. The embodiments illustrated in FIGS. 1-3 are tube-type tires wherein the radially inner surfaces of the bead portions are inclined at about 5° with respect to the axis of rotation of the tire. The distance Z is equal to between 0.3-0.5 H, preferably between 0.3-0.4 H, where H is the radial distance between a line A passing through the reference point P parallel with the axis of rotation of the tire, and a line B passing through the sidewall 12 of the tire at the widest part of the tire also parallel with said axis.

The axially inner portion 22B of each reinforcing ply extends radially outwardly adjacent the carcass ply 17 to a radially outer end S, which is located on a straight line Q—Q which is substantially perpendicular to the carcass ply 17 at the point where it intersects the carcass ply, and which intersects the radially outer end R of the axially outer portion 22B of the respective reinforcing ply 22. Put another way, both ends R and S of the reinforcing ply are located on a straight line Q—Q which is substantially perpendicular to the carcass ply 17 at the point where it intersects the carcass ply.

It is widely recognized in the tire art that the dimensions and locations of the components of a tire may vary slightly because of well known factors encountered during the tire manufacturing process. While it is preferred that a straight line extending between the ends of a reinforcing ply, or an end of a reinforcing ply and an end of a carcass ply, be exactly perpendicular to the carcass ply at the point where it intersects the carcass ply, it is believed that a tire according to the present invention will function satisfactorily as long as said straight line is substantially perpendicular to the carcass ply at the point where it intersects the carcass ply. As used herein and in the appended claims, a straight line is "substantially perpendicular to the carcass ply at the point where it intersects the carcass ply" so long as neither of the ends of tire components that it connects is more than 2.5 mm from a line which is in fact exactly perpendicular to the carcass ply at the point where the line connecting the ends of the tire components intersects the carcass ply. The 2.5 mm distance is measured along a perpendicular to the line which is in fact exactly perpendicular to the carcass ply at the appropriate point on the carcass ply.

It can be seen that the ends S and R of each reinforcing ply 22 lie on opposite sides of the neutral axis in the bead portion 11. The neutral axis is usually followed by the carcass ply 17 and is the boundary between compression stresses and tension stresses. Thus, in the present embodiment, when the tire 10 is under load the radially outer end S of the axially inner portion 22B of the reinforcing ply is subject to tension stresses and the radially outer end R of the axially outer portion 22A of the reinforcing ply is subject to compression stresses. It is believed that by arranging for both ends S and R of a reinforcing ply to be on a straight line which is substantially perpendicular to the carcass ply 17, and hence the neutral axis, the stresses within the bead portion generated by the moments of rotation of the forces acting on the ends S and R of the reinforcing ply can be reduced as compared with the moment of rotation of like ends which do not both lie on a straight line normal to the carcass ply.

In the present embodiment of the invention the turn-up portion 19 of the carcass ply also extends radially outwardly of the rim flange 23 when the tire is mounted upon its specified rim, and radially outwardly of the axially outer portion 22A of the reinforcing ply. The turn-up portion 19 of the carcass ply has its radially outer end U located at a distance X from said reference point P. The distance X is between 0.4 and 0.6 H and is preferably about 0.5 H, so that preferably the turn-up portion of the carcass ply 19 extends radially outwardly beyond the axially outer portion 22A of the reinforcing ply by a distance Y, as measured along the turn-up, which is between 0.07 and 0.17 H, preferably about 0.12 H.

Referring now to FIG. 3, there is shown the lower sidewall and bead portion of a tire according to a second embodiment of the invention. This embodiment, like that shown in FIGS. 1 and 2 is a tube-type tire. The turn-up portion 19 of the carcass ply 17 extends radially outwardly beyond the axially outer portion 22A of the reinforcing ply 22. The axially inner portion 22B of the reinforcing ply extends radially outwardly to terminate at a radially outer end T located on a straight line V—V which is perpendicular to the carcass ply and at the point where it intersects the carcass ply. Line V—V also passes through the radially outermost end U of the turn-up portion 19 of the carcass ply. Put another way, in a tire according to this embodiment the radially outer end T of the axially inner portion 22B of the reinforcing ply and the radially outer end U of the turn-up portion 19 of the carcass ply both lie on the same straight line V—V, with said straight line being perpendicular to the carcass ply 17 at the point where it intersects the carcass ply. By having the radially outer end T of the axially inner portion of reinforcing ply on the line V—V which is substantially perpendicular to the carcass ply passing through the radially outer end U of the carcass ply turn-up, load generated by the moments of rotation of the forces acting on the ends T and U of the reinforcing ply and carcass ply are reduced. In all other respects this second embodiment is similar to that described with reference to FIGS. 1 and 2, including the locations of the radially outer ends of the turn-up portion of the carcass ply and the axially outer portions of the reinforcing plies.

With reference now to FIG. 4, there is illustrated a radial cross-section through the bead portion 111 of a radial truck tire suitable for use on a drop center tubeless type wheel rim. The tire construction is similar to that described with reference to FIG. 1, and only the differences will be highlighted. Because this embodiment is directed to a tubeless tire it has a layer 115 of low permeability material located between the carcass ply 117 and the inflation chamber formed by the tire and a rim.

The bead portion 111 has a radially inner conical surface 120 which makes an angle of about 15° with the axis of rotation of the tire, and the reference point $P_2$ is defined by the intersection of said inner surface 120 with the curved outer axial surface 130 of the bead portion.

The carcass ply 117 is wrapped around the bead 113 in the same manner as in the first two embodiments and the turn-up portion 119 of the carcass ply extends radially outwardly for a distance $X_2$ from the reference point $P_2$. The distance $X_2$ is equal to about 0.3 H where H is defined as the radial distance between a line $A_2$ passing through the reference point $P_2$ parallel with the axis of rotation of the tire, and a parallel line $B_2$ passing through the sidewall at the widest part of the tire. As before, the turn-up portion 119 of the carcass ply extends radially outwardly of the rim flange 123 of a rim on which the tire is designed to be mounted.

A reinforcing ply 122 is wrapped around the bead 113 on the side of the carcass ply 117 furthest away from the bead and has portions 122A and 122B disposed on the axially outer and inner sides, respectively of the bead 113. The axially outer portion 122A of the reinforcing ply extends radially outwardly of the turn-up portion 119 of the carcass ply and terminates at a radially outer end $R_2$, disposed a distance $Z_2$ from the reference point $P_2$. The distance $Z_2$ is equal to about 0.4–0.45 H. As before, the axially inner portion 122B of the reinforcing ply extends radially outwardly to a radially outer end $S_2$ which is located on a straight line $Q_2$—$Q_2$ which is substantially perpendicular to the carcass ply 117 at the point where it intersects the carcass ply and passes through the radially outer end $R_2$ of the axially outer portion 122A of the reinforcing ply 122.

While the particular construction of reinforcing ply and carcass ply shown in FIG. 1 has been described with reference to a bead portion suitable for a tube-type wheel rim, and the construction of FIG. 4 has been described with reference to a bead portion suitable for a drop center tubeless wheel rim, it will be readily apparent that either construction of reinforcing ply and turn-up portion is suitable for use with either type of wheel rim.

Furthermore, while the present invention has been described with reference to the particular embodiments disclosed herein it will be obvious to a person skilled in the art that it is possible to make some alterations without departing from the spirit and scope of the present invention. For example, the relationship between the apex strip and the turn-up portion can be modified so that there is an elastomeric layer, or perhaps a wedge between the turn-up portion and the reinforcing ply so that they are no longer adjacent each other.

We claim:

1. A radial ply tire comprising a pair of bead portions having nominal bead diameters of at least 15 inches, each bead portion containing an annular bead, a carcass ply reinforced by steel cords extending between said beads and having a turn-up portion wrapped around each bead from the axially inner side to the axially outer side thereof, in each bead portion on the side of the carcass ply furthest away from the bead is located a reinforcing ply containing steel cords, portions of each reinforcing ply being disposed on each axial side of the respective bead, the axially outer portion of each reinforcing ply and the adjacent turn-up portion of the carcass ply both extending radially outwardly of the bead to their respective radially outer ends with the turn-up portion of the carcass ply extending radially outwardly beyond the axially outer portion of the reinforcing ply, and an axially inner portion of each reinforcing ply extending radially outwardly to its radially outer end, the radially outer end of the axially inner portion of the reinforcing ply and the radially outer end of the nearest turn-up portion of the carcass ply both lying on the same straight line, with said straight line being substantially perpendicular to the carcass ply at the point where it intersects the carcass ply.

2. A radial ply tire comprising a pair of bead portions having nominal bead diameters of at least 15 inches, each bead portion having a radially inner surface that is inclined at about 5° with respect to the axis of rotation of the tire, each of said bead portions containing an annular bead, a carcass ply reinforced by steel cords extending between said beads and having a turn-up portion wrapped around each bead from the axially inner side to the axially outer side thereof, in each bead portion on the side of the carcass ply furthest away from the bead is located a reinforcing ply containing steel cords that are arranged at an angle of between 55° to 65° with a respective radial plane of the tire, portions of each reinforcing ply being disposed on each axial side of the respective bead, the axially outer portion of each reinforcing ply and the adjacent turn-up portion of the carcass ply both extending radially outwardly of the bead to their respective radially outer ends with the turn-up portion of the carcass ply extending radially outwardly beyond the axially outer portion of the reinforcing ply, and an axially inner portion of each reinforcing ply extending radially outwardly to its radially outer end, the radially outer end of the axially inner portion of the reinforcing ply and the radially outer end of the nearest turn-up portion of the carcass ply both lying on the same straight line, with said straight line being substantially perpendicular to the carcass ply at the point where it intersects the carcass ply, the radially outer end of the axially outer portion of each reinforcing ply being located at a distance of between 0.3–0.4 H from a reference point P defined by the intersection of a radially extending line passing through the center of the bead and the radially inner surface of the bead portion, the radially outer end of the adjacent turn-up portion of the carcass ply being located at a distance of between 0.4 and 0.6 H from said reference point, and wherein H is the radial distance between a line passing through the reference point P parallel with the axis of rotation of the tire and another line that is also parallel to said axis and passes through a sidewall of the tire at the widest part of the tire, the radially outer end of the turn-up portion of the carcass ply being located at a distance of about 0.5 H from said reference point P.

* * * * *